(12) United States Patent
Kobayashi

(10) Patent No.: US 10,742,160 B2
(45) Date of Patent: Aug. 11, 2020

(54) PANEL MEMBER SECURING STRUCTURE AND PANEL MEMBER SECURING TOOL

(71) Applicant: Yanegijutsukenkyujo Co., Ltd., Takahama-shi, Aichi (JP)

(72) Inventor: Shuichi Kobayashi, Takahama (JP)

(73) Assignee: Yanegijutsukenkyujo Co., Ltd., Takahama-shi, Aichi (JP)

( * ) Notice: Subject to any disclaimer, the term of this patent is extended or adjusted under 35 U.S.C. 154(b) by 101 days.

(21) Appl. No.: 16/151,745

(22) Filed: Oct. 4, 2018

(65) Prior Publication Data
US 2019/0131918 A1  May 2, 2019

(30) Foreign Application Priority Data

Nov. 1, 2017  (JP) .................. 2017-212230

(51) Int. Cl.
| | | |
|---|---|---|
| *H02S 20/23* | (2014.01) | |
| *F16B 2/12* | (2006.01) | |
| *F16B 5/06* | (2006.01) | |
| *F16B 5/02* | (2006.01) | |
| *F24S 25/60* | (2018.01) | |
| *H02S 30/00* | (2014.01) | |

(52) U.S. Cl.
CPC ............ *H02S 20/23* (2014.12); *F16B 2/12* (2013.01); *F16B 5/02* (2013.01); *F16B 5/065* (2013.01); *F24S 25/60* (2018.05); *H02S 30/00* (2013.01)

(58) Field of Classification Search
CPC .......... H02S 20/00; H02S 20/23; H02S 20/24; H02S 20/30; H02S 30/00; F16B 2/12; F16B 5/02; F16B 5/065; F16H 25/20; F24S 25/60; Y02E 10/47; Y02B 10/12

USPC ............................................ 52/698; 248/237
See application file for complete search history.

(56) References Cited

U.S. PATENT DOCUMENTS

| | | | | |
|---|---|---|---|---|
| 927,619 | A | 7/1909 | Wells | |
| 8,806,813 | B2 * | 8/2014 | Plaisted | H01R 4/64 |
| | | | | 52/173.3 |
| 9,431,953 | B2 * | 8/2016 | Stearns | H02S 20/23 |
| 9,647,433 | B2 * | 5/2017 | Meine | F24S 25/61 |
| 9,876,463 | B2 * | 1/2018 | Jasmin | H02S 20/23 |
| 10,020,773 | B2 * | 7/2018 | Molina | H02S 20/23 |
| 10,088,201 | B2 * | 10/2018 | Stephan | H02S 20/23 |

(Continued)

FOREIGN PATENT DOCUMENTS

JP  5705380 B2  1/2014

*Primary Examiner* — Joshua J Michener
*Assistant Examiner* — James J Buckle, Jr.
(74) *Attorney, Agent, or Firm* — Ken ichiro Yoshida

(57) ABSTRACT

A panel member securing tool includes a stand holding a shaft with an external thread in a state of restricting movement in the axial direction, a cylindrical portion through which the stand is inserted, a lower holder having installation surfaces extending to both sides outward from the cylindrical portion, a flat plate portion through which a bolt hole portion and a tool hole portion are formed, an upper holder having panel pressing portions extending to both sides outward from the flat plate portion, a bolt inserted through the bolt hole portion and screwed with a first threaded groove formed in the stand, a second threaded groove formed in the cylindrical portion screwed with the external thread, and a hole or a space formed in the stand on an extended line of a center axis of the shaft between a tool engaging portion of the shaft and the tool hole portion.

8 Claims, 11 Drawing Sheets

(56) References Cited

U.S. PATENT DOCUMENTS

| | | | |
|---|---|---|---|
| 10,211,773 B2* | 2/2019 | Jasmin | H02S 20/23 |
| 2011/0214365 A1* | 9/2011 | Aftanas | F24S 25/636 |
| | | | 52/173.3 |
| 2015/0288320 A1* | 10/2015 | Stearns | H02S 20/23 |
| | | | 52/173.3 |
| 2017/0040931 A1* | 2/2017 | Schuit | H02S 20/23 |
| 2017/0063288 A1* | 3/2017 | Schuit | H02S 20/23 |
| 2017/0102167 A1* | 4/2017 | Stephan | H02S 20/23 |
| 2018/0323744 A1* | 11/2018 | Hudson | H02S 30/10 |
| 2019/0013772 A1* | 1/2019 | Bamat | H02S 20/23 |
| 2019/0036474 A1* | 1/2019 | Schuit | H02S 20/23 |

* cited by examiner

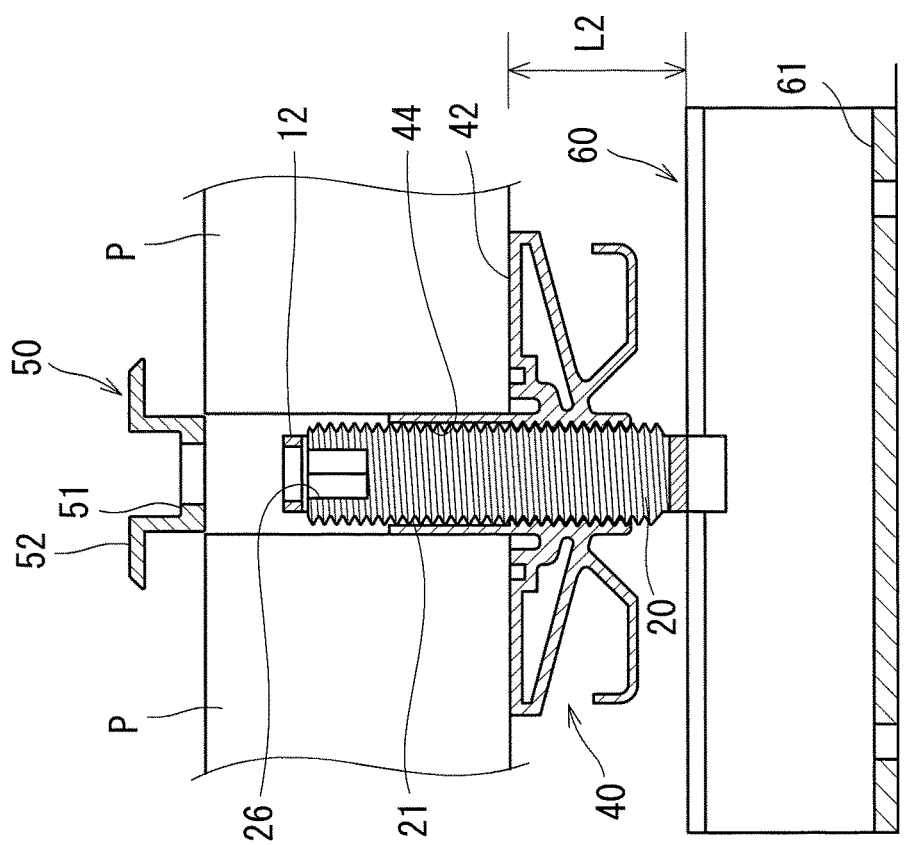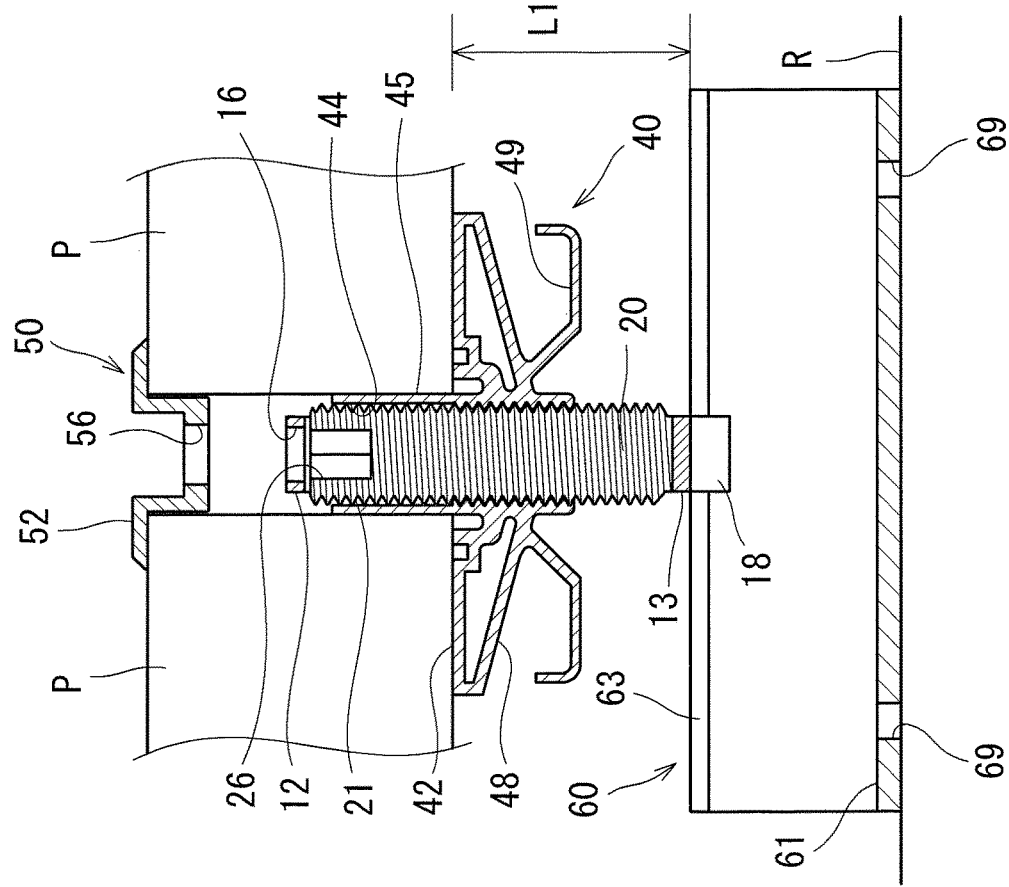
Fig. 5A
Fig. 5B

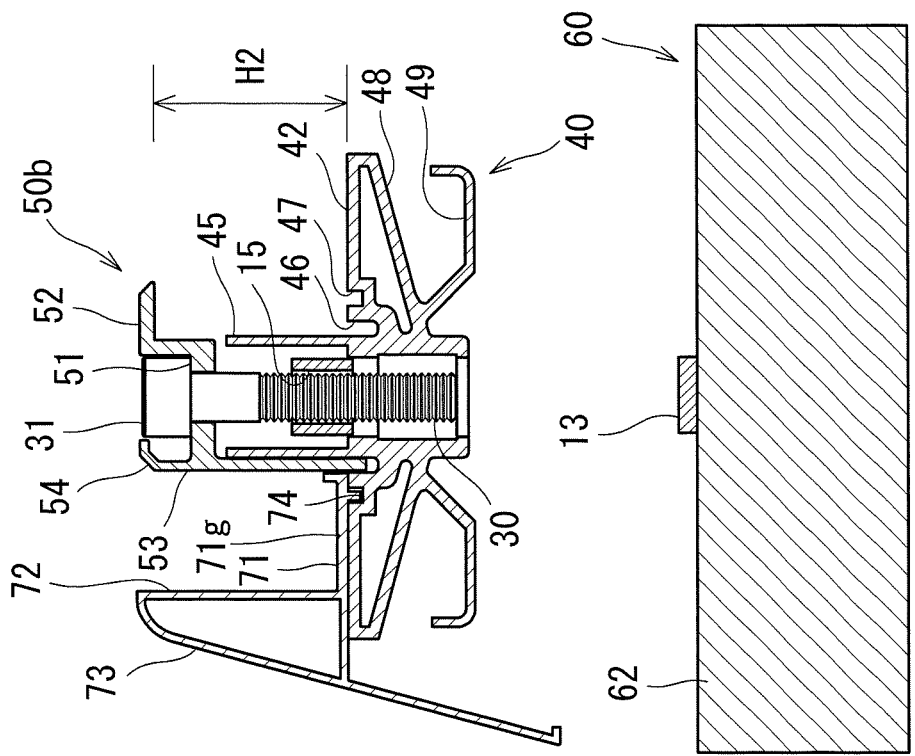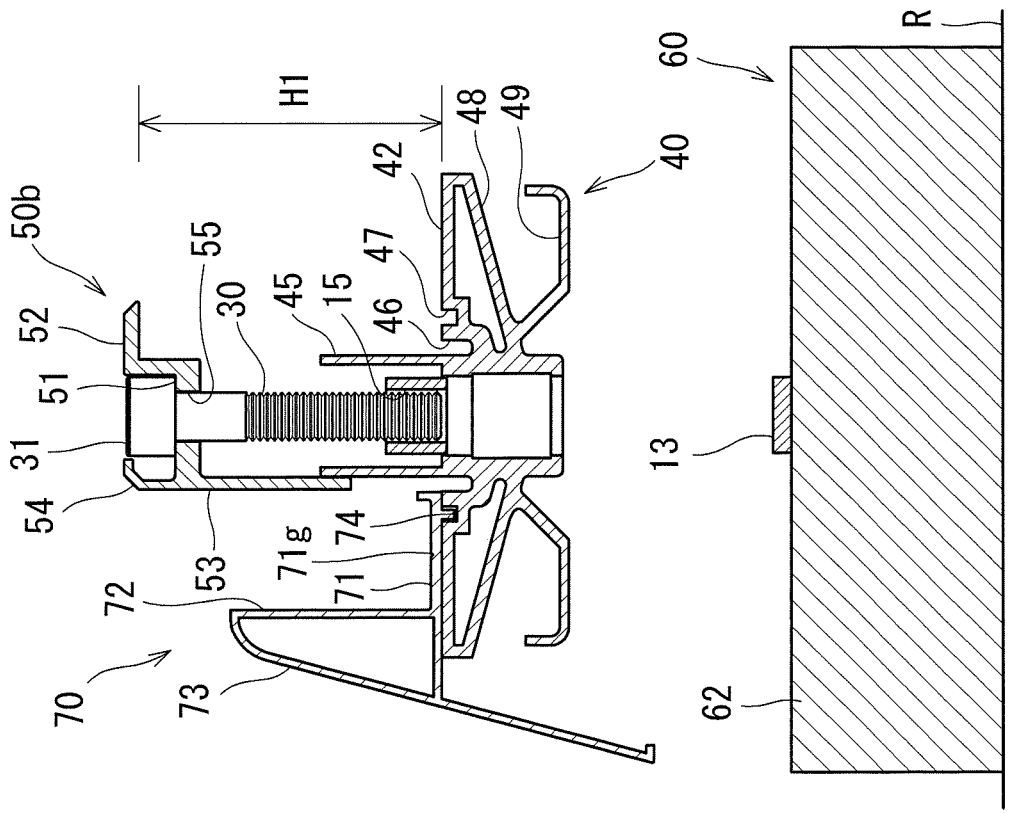

PANEL MEMBER SECURING STRUCTURE AND PANEL MEMBER SECURING TOOL

BACKGROUND OF THE INVENTION

Field of the Invention

The present invention relates to a panel member securing structure in which a panel member such as a solar battery module is mounted on a roof face, and a panel member securing tool that is used for the securing structure.

Description of the Related Art

When a panel member such as a solar battery module configured by a solar battery panel of which peripheral edges are held by a frame and a solar water heater is installed on roof, a base member that is fastened onto a roof face and a securing tool for securing the panel member onto the base member are used in some cases. The panel member is mounted on the roof face through the base member by securing the panel member onto the base member in a pressure manner with the securing tool in a state in which the panel member is installed on the base member.

In the above-described installation of the panel member, the height of the panel member is desired to be adjusted in some cases. The height of the panel member is desired to be adjusted, for example, when, in mounting of the plurality of panel members on the roof, the heights of the upper surfaces of the panel members are non-uniform depending on fastening positions of the base members onto the roof face due to shapes of roof covering materials the roof. Alternatively, the height of the panel member is desired to be set in consideration of a relation with another structure on the roof in some cases. In response to the desire, the present applicant has proposed a securing structure enabling height adjustment of a panel member by interposing spacers between a base member and a securing tool (see Patent document 1, which is Japanese Patent No. 5705380).

This proposal however requires the height adjustment of the panel member to be performed before the panel member is installed on the base member. When the height adjustment becomes necessary after the installation of the panel member, the panel member needs to be once detached, resulting in lowering of construction efficiency. For this reason, a securing tool enabling height adjustment in a state in which a panel member is installed has been desired.

In recent years, proposal intended to respond to the above-described desire has been made (see Patent document 2, which is U.S. Patent Publication No. 2017/0040931). A securing tool related to this proposal is a tool for securing a solar panel onto a roof face through a base member, and includes a stanchion erected from a base, a lower bracket on which the solar panel is installed, and an upper bracket that clamps the solar panel between it and the lower bracket. The stanchion has two arms extending in the up-down direction and tooth grooves are formed in the inner side surfaces of both of the arms, which face each other. A helical drive is engaged with the tooth grooves. The helical drive has a length in the radial direction, which is larger than the width of the arms of the stanchion, and a portion thereof beyond the arms is held on a shelf-like portion formed on the bottom surface of the lower bracket in a rotatable manner. A tool hole is formed in the helical drive and the tool can access the tool hole through first hole portions that are respectively formed through the upper bracket and the lower brackets. Furthermore, a second hole portion is formed through the upper bracket in addition to the first hole portion and a bolt inserted through the second hole portion is screwed together with a threaded groove formed in the lower bracket.

With the securing tool having the above-described configuration in Patent document 2, the helical drive moves up and down along the arms of the stanchion by rotating the helical drive with the tool. The up-down movement of the helical drive causes the lower bracket holding the helical drive in the rotatable manner to move up and down. Accordingly, height adjustment of the solar panel can be performed in a state in which the solar panel is installed on the lower bracket. The solar panel can be secured to the lower bracket such that the upper bracket presses the solar panel toward the lower bracket by fastening the bolt inserted through the second hole portion of the upper bracket to the threaded groove of the lower bracket. The solar panel clamped between the upper bracket and the lower bracket is thereby mounted on the roof face through the stanchion and the base member.

The securing tool in Patent document 2 however applies force of fastening the bolt for securing the solar panel to the lower bracket with the threaded groove provided therein. The force applied to the lower bracket is transmitted to the helical drive held by the lower bracket, is transmitted to the tooth grooves with which the helical drive are engaged, is transmitted to the stanchion in which the tooth grooves are formed, and then, is transmitted to a base on which the stanchion stands. That is to say, the fastening force with the bolt is transmitted while passing through all of the components of the securing tool in the order of the lower bracket, the helical drive, the tooth grooves of the arms, and the stanchion. That is to say, the fastening force with the bolt acts on all of the components in the securing tool in Patent document 2. Accordingly, there arises the risk that the respective components of the securing tool are deformed or damaged due to loads thereon with the force.

Furthermore, with the securing tool in Patent document 2, when force of trying to lift the solar panel acts with a strong wind, the force acts directly on the bolt fastened to the threaded groove of the lower bracket. The action of the force possibly causes the bolt to be bent due to a burden applied thereto.

In order to prevent the respective components from being deformed and damaged, all of the components need to be largely increased in thicknesses to increase mechanical strengths. The increase in the thicknesses arises the problem that the entire securing tool is increased in weight and cost.
Patent document 1: Japanese Patent No. 5705380
Patent document 2: U.S. Patent Publication No. 2017/0040931

SUMMARY OF THE INVENTION

The present invention has been made in consideration of the above-mentioned circumstances, and an object thereof is to provide a panel member securing structure that enables height adjustment in a state in which a panel member is installed and reduction in loads acting on components of a securing tool, and a panel member securing tool that is used for the securing structure.

In order to achieve the above-mentioned object, a panel member securing structure (hereinafter, simply referred to as a "securing structure" in some cases) according to an aspect of the present invention "includes a base member that is fastened to a roof face and a securing tool that secures a panel member onto the base member, wherein the securing tool includes a stand, a lower holder moving up and down along the stand, an upper holder holding the panel member together with the lower holder, and a shaft with an external thread formed on an outer circumferential surface, the stand has a pair of side wall portions, holds the shaft between the side wall portions in a state of restricting movement of the shaft in an axial direction, and has a first threaded groove at a position which is not interfered with the shaft, the shaft is exposed from the stand in a radial direction of the external thread and has a tool engaging portion on an end portion, the lower holder has a cylindrical portion through which the stand is inserted, a second threaded groove formed in an inner circumferential surface of the cylindrical portion, and two installation surfaces extending to both sides outward from the cylindrical portion in a direction orthogonal to an axial direction of the cylindrical portion, the upper holder has a flat plate portion through which a bolt hole portion and a tool hole portion are formed, and (a) panel pressing portion(s) extending to both sides or one side outward from the flat plate portion, the stand is erected from the base member, the panel member is held between at least one of the installation surfaces and the panel pressing portion by fastening a bolt inserted through the bolt hole portion to the first threaded groove, a portion of the external thread, which is exposed from the stand, and the second threaded groove are screwed together, and the tool hole portion is located on an extended line of a center axis of the shaft and a hole portion or a space is formed on the extended line between the shaft and the tool hole portion in the stand."

This securing structure has the configuration in which the panel member in a state of being installed on the installation surface of the lower holder is held between the panel pressing portion of the upper holder and the installation surface of the lower holder by fastening the bolt inserted through the bolt hole portion of the upper holder to the first threaded groove of the stand. The securing tool that is used for the securing structure has the configuration in which the two installation surfaces of the lower holder extend to both sides outward from the cylindrical portion whereas the panel pressing portion(s) of the upper holder extend(s) to both sides or one side outward from the flat plate portion. Accordingly, when a plurality of panel members are mounted on roof, it is sufficient that the securing tool having the upper holder with the panel pressing portion extending to only one side is used for the panel member at the most-eaves side or the most-ridge side and the securing tool having the upper holder with the panel pressing portions extending to both sides is used as the securing tool securing both of the adjacent panel members at an intermediate position between the eaves and ridge. The lower holder is commonly used regardless of a position at which the securing tool is mounted.

When the securing structure having this configuration is constructed using the above-described securing tool, the height adjustment can be performed while the panel member is installed on the lower holder in a state in which the upper holder is temporarily fastened to the stand with the bolt or in a state in which the upper holder is detached from the securing tool. That is to say, the shaft has the tool engaging portion which is engaged with a tool, the tool hole portion provided in the upper holder is located on the extended line of the center axis of the shaft, and the stand holding the shaft also has the hole portion or the space provided along the extended line of the center axis of the shaft. The tool inserted into the tool hole portion can therefore be made to reach the tool engaging portion of the shaft and be engaged with the tool engaging portion to rotate the shaft. The stand is inserted through the cylindrical portion of the lower holder and the portion of the external thread of the shaft, which is exposed from the stand in the radial direction, is screwed together with the second threaded groove formed in the inner circumferential surface of the cylindrical portion. The stand restricts the movement of the shaft in the axial direction. Therefore, when the shaft is rotated, the lower holder is moved up and down without up-down movement of the shaft itself. The configuration for moving the lower holder up and down is provided in the cylindrical portion of the lower holder and gives no influence on the installation surfaces at both of the outer sides of the cylindrical portion. Accordingly, the height adjustment of the panel member can be performed by moving the lower holder up and down in the state in which the panel member is installed on the installation surface.

The force of fastening the bolt for holding the panel member between the upper holder and the lower holder acts on the stand in which the first threaded groove is formed. The force of fastening the bolt is transmitted to the base member through the stand because the stand is erected from the base member. That is to say, the force of fastening the bolt acts on neither of the lower holder, the second threaded groove, nor the external thread of the shaft. Accordingly, loads that are applied to the respective components of the securing tool can be reduced unlike the securing tool in Patent document 2 in which the fastening force with the bolt is transmitted to all of the components of the securing tool in the order of the lower bracket, the helical drive, the tooth grooves of the arms, and the stanchion. With the reduction in the loads that are applied to the respective components, large mechanical strengths are not required for the respective components, thereby reducing the securing tool in weight and manufacturing cost.

Furthermore, the shaft having the external thread is held between the pair of side wall portions of the stand in the state in which the movement thereof in the axial direction is restricted. Examples of a holding mode of the shaft can include a mode in which the respective upper ends of the pair of side wall portions are connected by a top surface portion, the respective lower ends thereof are connected by a bottom surface portion, and a distance between the top surface portion and the bottom surface portion is slightly larger than the length of the shaft. Furthermore, the examples of the holding mode can include a mode in which upper shelf portions respectively project to the mating sides from the upper ends of the pair of side wall portions, the lower ends of the side wall portions are connected by the bottom surface portion, and a distance between the upper shelf portions and the bottom surface portion is slightly larger than the length of the shaft. In these modes, the length of the shaft is substantially equal to the length of the side wall portions, eventually, the length of the stand. An advantage that presence of the shaft can increase the mechanical strength of the stand in the axial direction can therefore be provided.

In addition, when force to lift the panel member acts with a strong wind, the force also acts on the lower holder to which the panel member is secured. In the securing structure, the bolt securing the panel member to the lower holder is screwed together with the first threaded groove of the stand inserted through the cylindrical portion of the lower bracket. Therefore, the force to lift the panel member does not act on the bolt. Accordingly, the risk that the bolt is bent due to a burden applied thereto is reduced unlike the securing structure in Patent document 2 in which the force to lift the solar panel directly acts on the bolt fastened to the threaded groove of the lower bracket.

In the panel member securing structure according to the aspect of the invention, the configuration in which "the upper holder does not abut against the installation surfaces of the lower holder" can be employed in addition to the above-mentioned configuration.

In the securing tool in Patent document 2, the upper bracket includes a vertical wall and the lower end thereof is made to abut against the lower bracket. Therefore, various types of upper brackets having different lengths of the vertical walls need to be prepared in accordance with the heights (thicknesses) of the solar panels. By contrast, in this configuration, the upper holder does not abut against the installation surfaces of the lower holder in the state in which the panel member is held between the upper holder and the lower holder. Therefore, even each of the panel members having different heights can be held between the upper holder and the lower holder using a single type of securing tool.

A panel member securing tool (hereinafter, simply referred to as a "securing tool" in some cases) according to another aspect of the present invention "includes a stand, a lower holder moving up and down along the stand, an upper holder for holding a panel member together with the lower holder, and a shaft with an external thread formed on an outer circumferential surface, the stand has a pair of side wall portions, holds the shaft between the side wall portions in a state of restricting movement of the shaft in an axial direction, and has a first threaded groove at a position which is not interfered with the shaft, the shaft is exposed from the stand in a radial direction of the external thread and has a tool engaging portion on an end portion, the lower holder has a cylindrical portion through which the stand is inserted, a second threaded groove formed in an inner circumferential surface of the cylindrical portion, and two installation surfaces extending to both sides outward from the cylindrical portion in a direction orthogonal to an axial direction of the cylindrical portion, the upper holder has a flat plate portion through which a bolt hole portion and a tool hole portion are formed, and (a) panel pressing portion(s) extending to both sides or one side outward from the flat plate portion, a bolt inserted through the bolt hole portion is screwed together with the first threaded groove, a portion of the external thread, which is exposed from the stand, and the second threaded groove are screwed together, and the tool hole portion is located on an extended line of a center axis of the shaft and a hole portion or a space is formed on the extended line between the shaft and the tool hole portion in the stand."

The securing tool having this configuration is used for the above-described securing structure. The above-described securing structure is constructed and the above-described action effects are exerted by fastening the base member to the roof and securing the panel member onto the base member using the securing tool having this configuration.

As described above, the present invention can provide a panel member securing structure that enables the height adjustment in the state in which a panel member(s) is(are) installed and reduction in loads acting on components of a securing tool, and a panel member securing tool that is used for the securing structure.

BRIEF DESCRIPTION OF THE DRAWINGS

FIGS. 5A and 5B are views for explaining height adjustment with the securing tool in FIG. 1 using a cross-sectional view cut along line Y-Y.

FIGS. 8A and 8B are views for explaining securing of each of panel members having different heights with the securing tool in FIG. 7 using a cross-sectional view cut along a cutting line corresponding to the line Z-Z.

DESCRIPTION OF THE EMBODIMENTS

Figure 1:
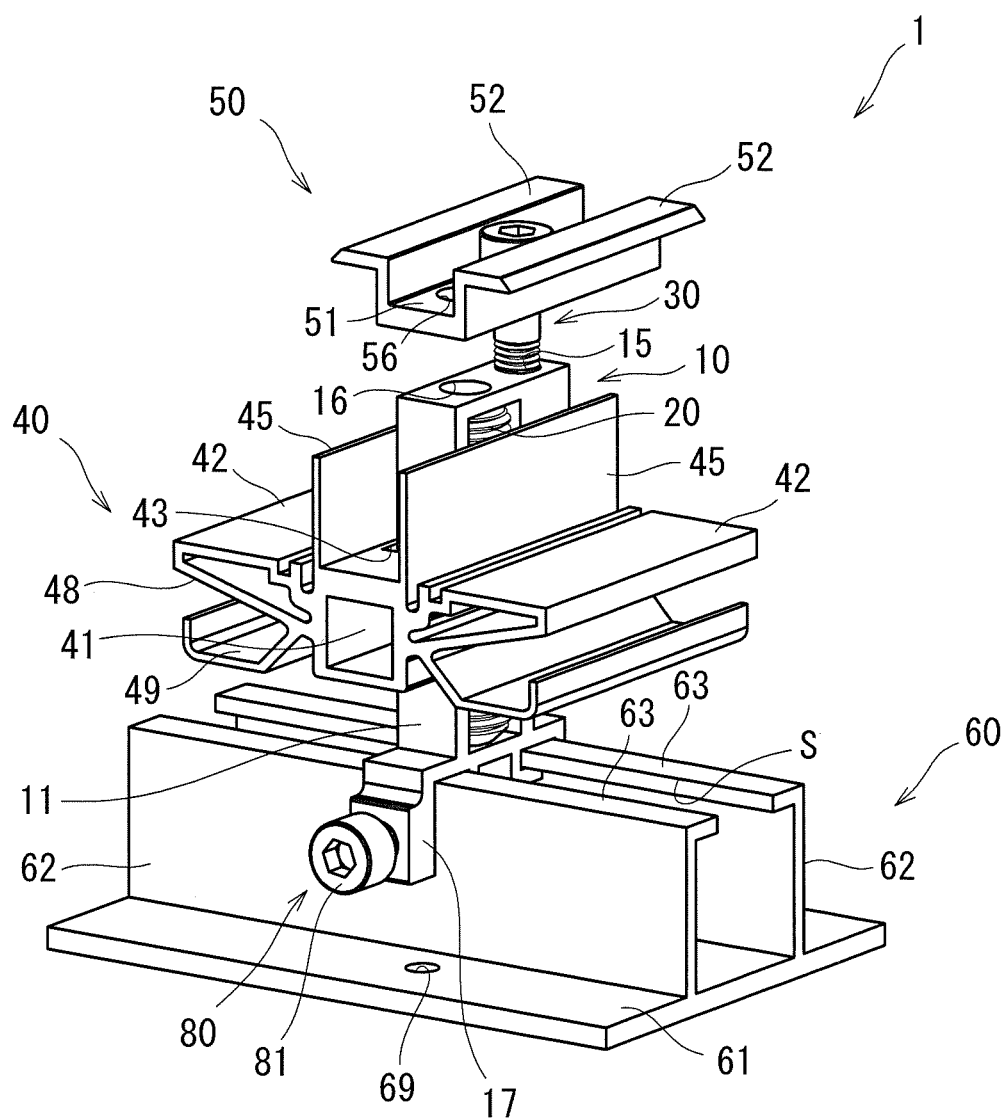
FIG. 1 is a perspective view illustrating a state in which a securing tool according to a first embodiment is secured onto a base member.
Figure 2:
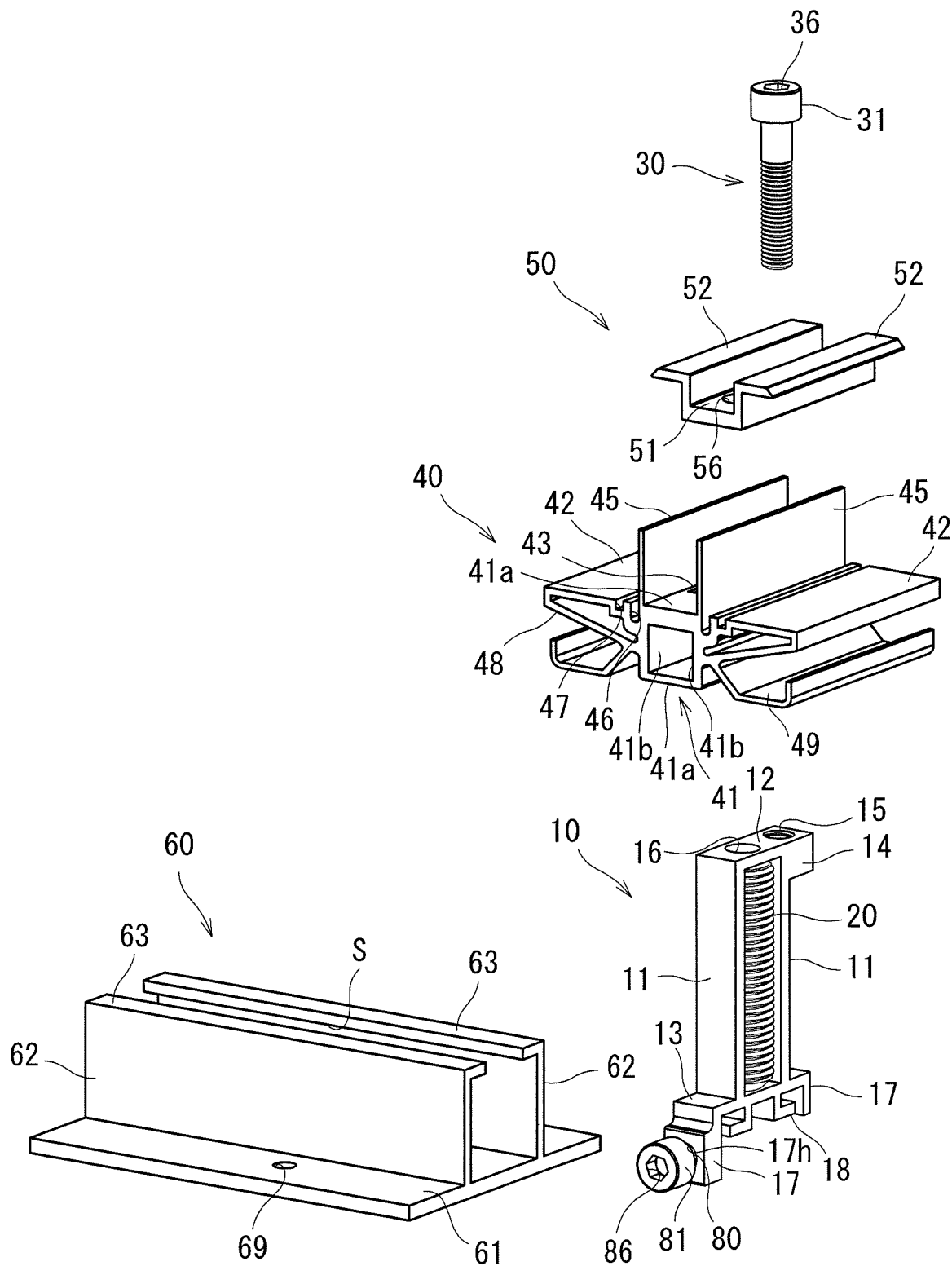
FIG. 2 is an exploded perspective view of the securing tool in FIG. 1 and is a perspective view illustrating a base member.
Figure 3A:
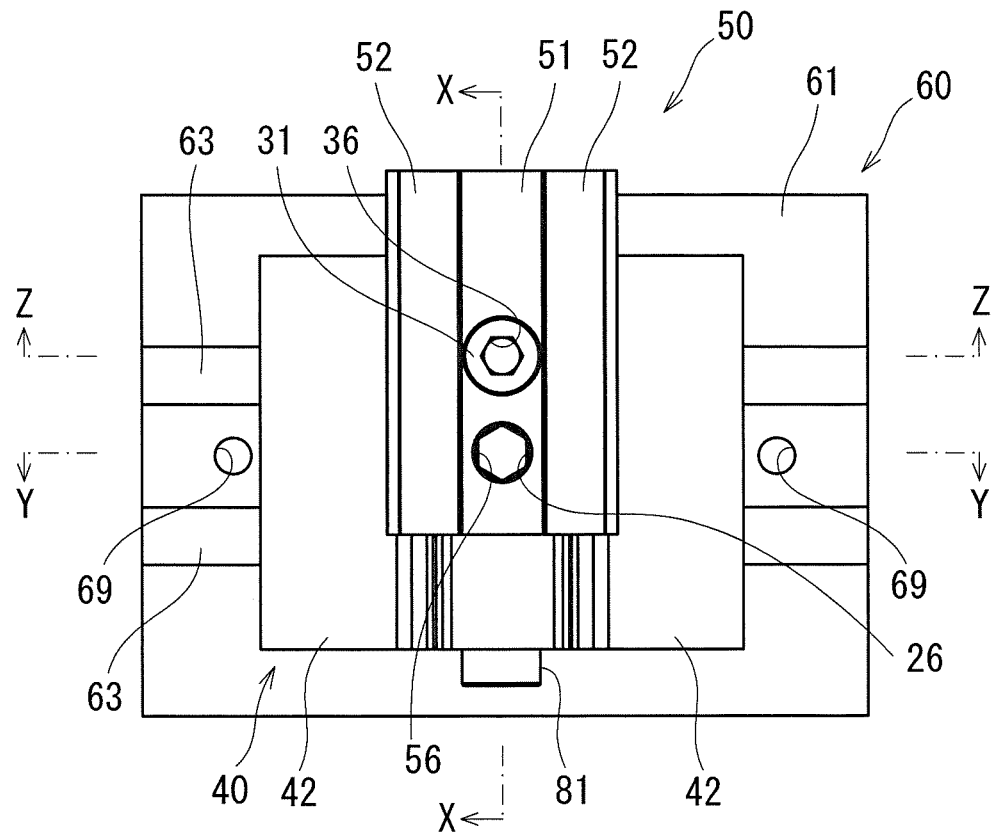
FIG. 3A is a plan view illustrating the state in which the securing tool in FIG. 1 is secured onto the base member and FIG. 3B is a perspective view when a lower holder is cut along line X-X.
Figure 3B:
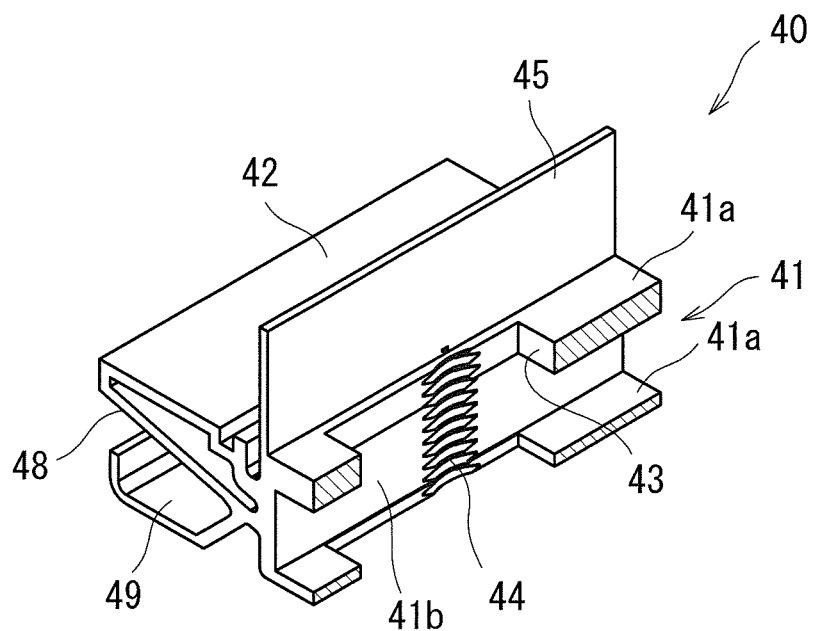
Figure 4:
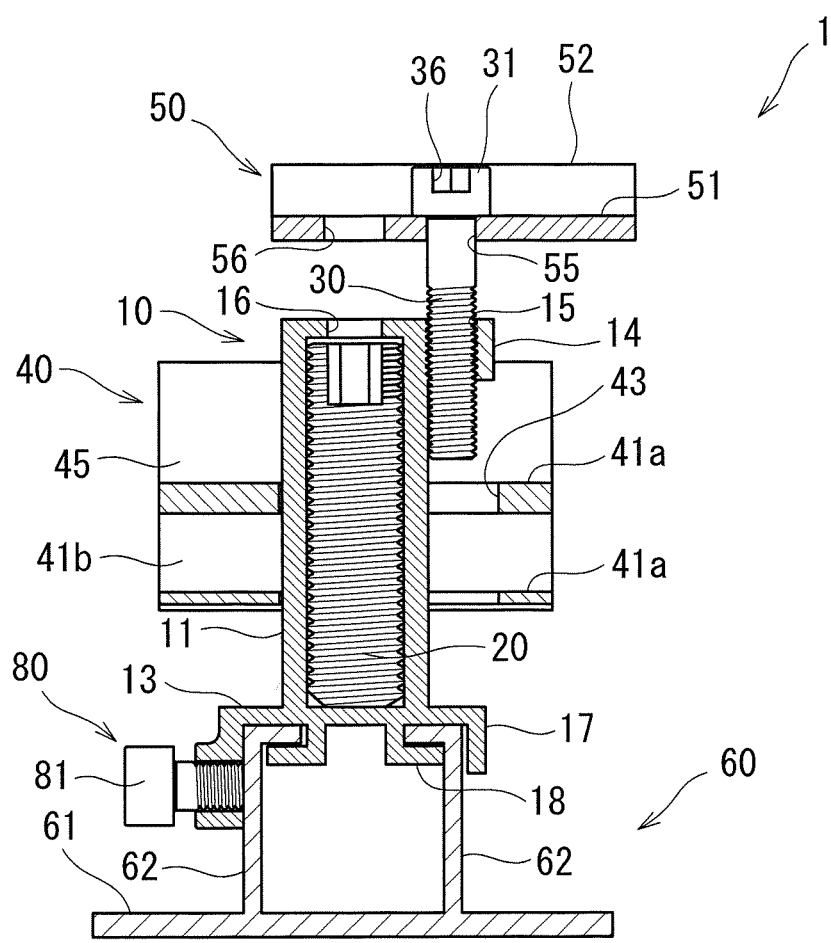
FIG. 4 is a cross-sectional view cut along line X-X, which illustrates the state in which the securing tool in FIG. 1 is secured onto the base member.

Hereinafter, a securing tool, a base member that is used together with the securing tool, a securing structure that is constructed using the securing tool and the base member as specific embodiments of the present invention will be described with reference to the drawings. First, a securing tool 1 according to a first embodiment and a base member 60 that is used together therewith will be described with reference to FIG. 1 to FIG. 6B.

The base member 60 includes a flat plate-like base surface 61, a pair of standing wall portions 62 erected from the base surface 61, and a pair of lip pieces 63 extending inward from upper end sides of the pair of standing wall portions 62. The standing wall portions 62 form right angles with respect to the base surface 61 and the lip pieces 63 form right angles with respect to the standing wall portions 62. Accordingly, the pair of lip pieces 63 is in parallel with the base surface 61. The pair of lip pieces 63 is separated from each other and a space therebetween forms a slit S. A plurality of hole portions 69 are formed through the base surface 61.

The securing tool 1 in the first embodiment includes a stand 10, a lower holder 40, an upper holder 50, a shaft 20, and a bolt 30. The stand 10 includes a pair of side wall portions 11, a top surface portion 12 connecting the upper ends of the pair of side wall portions 11, and a bottom surface portion 13 connecting the lower ends of the pair of side wall portions 11. The bottom surface portion 13 extends outward from the pair of side wall portions 11 and locking pieces 17 respectively extend to the opposite sides to the side wall portions 11 from both of the ends of the bottom surface portion 13. A pair of guiding pieces 18 projects in the same direction as the locking pieces 17 from the bottom surface portion 13 at the inner sides relative to the locking pieces 17. A distance between one of the locking pieces 17 and the guiding piece 18 located at the same side is slightly larger than the width of each lip piece 63. A hole portion 17h with a threaded groove formed in an inner circumferential surface thereof is formed through one of the locking pieces 17 and a bolt 80 penetrates through the hole portion 17h. The bolt 80 has a tool engaging portion 86 which is engaged with a tool on a head 81 thereof. The tool engaging portion 86 is a hexagonal recess portion which is engaged with a hexagonal wrench as the tool.

In the stand 10, the pair of side wall portions 11, the top surface portion 12, and the bottom surface portion 13 form a longitudinal frame body and the shaft 20 is held therein. The shaft 20 has a length which is substantially equal to a distance between the top surface portion 12 and the bottom surface portion 13 and is just fitted into the longitudinal frame body. An external thread 21 is formed on the outer circumferential surface of the shaft 20 over the entire length. A commercially available "headless bolt" can be used as the shaft 20. The length of the external thread 21 in the radial direction is larger than the width of the side wall portions 11. Accordingly, the external thread 21 of the shaft 20 held in the stand 10 is exposed outward from the stand 10 in the radial direction.

The shaft 20 has a tool engaging portion 26 which is engaged with a tool on an upper end, that is, an end portion at the top surface portion 12 side. The tool engaging portion 26 is a hexagonal recess portion which is engaged with a hexagonal wrench as the tool. A tool hole portion 16 is formed through the top surface portion 12 of the stand 10 so as to be located on an extended line of a center axis of the shaft 20.

The stand 10 further includes a bolt supporting portion 14 projecting outward from an upper portion of one of the side wall portions 11. A first threaded groove 15 with an internal thread formed on an inner circumferential surface thereof is formed through the bolt supporting portion 14. The axial direction of the first threaded groove 15 is in parallel with the axial direction of the shaft 20. The internal thread of the first threaded groove 15 is screwed together with the external thread of the bolt 30. The bolt 30 has a tool engaging portion 36 which is engaged with a tool on a head 31 thereof. The tool engaging portion 36 is a hexagonal recess portion which is engaged with a hexagonal wrench as the tool.

The lower holder 40 includes a center portion 41, a cylindrical portion 43 formed through the center portion 41, and two installation surfaces 42 extending to both of the outer sides from the center portion 41. The center portion 41 has a square cylinder shape and the cylindrical portion 43 is formed therein so as to penetrate through one pair of face portions 41a of two pairs of face portions 41a and 41b configuring peripheral walls of the center portion 41. A second threaded groove 44 as an internal thread that is screwed together with the external thread 21 of the shaft 20 is formed in portions of the other pair of face portions 41b, which configure the inner circumferential surface of the cylindrical portion 43. The two installation surfaces 42 extend into a flat plate-like manner form to both sides outward from the upper face portion 41a in the direction orthogonal to the axial direction of the cylindrical portion 43. A pair of flat plate-like stoppers 45 projects upward from the boundaries between the respective installation surfaces 42 and the center portion 41 so as to form right angles with respect to the installation surfaces 42. On the respective installation surfaces 42, first grooves 46 are formed along the stoppers 45 and second grooves 47 are provided in parallel with the first grooves 46 with slight spaces therebetween.

In order to increase the mechanical strength of the installation surfaces 42, ribs 48 connect the outer end sides of the respective installation surfaces 42 and the face portions 41b of the center portion 41. Second installation surfaces 49 extend in the same directions as the installation surfaces 42 from the respective face portions 41b below the ribs 48. Electric wires for supplying electricity to solar batteries when the panel member is a solar battery module or wires such as pipes for circulating water or hot water when the panel member is a solar water heater can be installed on the second installation surfaces 49.

The upper holder 50 includes a flat plate portion 51 and two panel pressing portions 52 extending to both of the outer sides from the flat plate portion 51. Although the panel pressing portions 52 which are erected at right angles from the end sides of the flat plate portion 51 and are further bent outward at right angles are exemplified herein, the flat plate portion and the panel pressing portions may be on the same plane. A tool hole portion 56 and a bolt hole portion 55 are formed through the flat plate portion 51. The bolt hole portion 55 of them is located at the center of the flat plate portion 51.

Each of the base member 60, and the stand 10, the lower holder 40, and the upper holder 50 configuring the securing tool 1 can be easily manufactured by forming a member having a constant cross section orthogonal to an extrusion direction by extrusion molding of a metal material such as aluminum, and then, performing processing of forming the hole portions and the threaded grooves therein.

All of the tool engaging portion 36 of the bolt 30, the tool engaging portion 26 of the shaft 20, and the tool engaging portion 86 of the bolt 80 are the hexagonal recess portions and the sizes of these hexagonal recess portions are the same in the embodiment. All of the bolt 30, the shaft 20, and the bolt 80 can therefore be rotated using a common tool.

Next, mounting of the panel members P on roof using the securing tool 1 and the base member 60 having the above-described configurations will be described mainly with reference to FIG. 5A to FIG. 6B. The case in which the plurality of panel members P are mounted on a roof face R and one securing tool 1 supports both of the two adjacent panel members P will be described herein.

First, the base members 60 are mounted on the roof face R. In this case, the base members 60 can be fastened to the roof face R with screws or nails inserted through the hole portions 69 formed through the base surfaces 61. Rainwater can be prevented from flowing down along the screws or nails and entering a roof lower space by interposing waterproof sheets (not illustrated) such as butyl rubber between the base surfaces 61 and the roof face R.

As for each of the securing tools 1, an upper portion of the stand 10 is inserted through the cylindrical portion 43 of the lower holder 40 from below, and a portion of the external thread 21 of the shaft 20, which is exposed from the stand 10, is screwed together with the second threaded groove 44 of the lower holder 40. The lower end of the bolt 30 inserted through the bolt hole portion 55 from above the upper holder 50 is screwed together with the first threaded groove 15 of the stand 10. The upper holder 50 is thus temporarily fastened to the stand 10. It should be noted that the upper holder 50 may be detached from the securing tool 1 before height adjustment, which will be described later, is finished.

When each of the securing tools 1 is mounted on each of the base members 60, the bottom surface portion 13 of the stand 10 is installed on the pair of lip pieces 63 of the base member 60. In this case, one of the lip pieces 63 is located between the locking piece 17 and the guiding piece 18 located at the same side in the pairs of locking pieces 17 and guiding pieces 18 of the stand 10. The position of the securing tool 1 on the roof face R can be adjusted by causing the stand 10 to slide along the slit S in the above-described state. In a state in which the locking piece 17 having no hole portion 17h for the bolt 80 is made to abut against the standing wall portion 62 of the base member 60, the bolt 80 inserted through the hole portion 17h of the other locking piece 17 is advanced to press the front end of the bolt 80 against the standing wall portion 62. The securing tool 1 is thereby secured onto the base member 60 with friction force between the bolt 80 and the standing wall portion 62. The stand 10 installed on the lip pieces 63 form a right angle with respect to the base surface 61 because the base surface 61 and the lip pieces 63 are in parallel with each other. Accordingly, the stand 10 and the shaft 20 are erected at right angles with respect to the roof face R.

After the plurality of securing tools 1 are thus mounted on the roof face R through the base members 60, the panel members P are respectively installed on the two installation surfaces 42 of each of the securing tools 1. In this case, the panel members P can be easily positioned by causing the end sides of the panel members P to abut against the stoppers 45 projecting upward from the installation surfaces 42 in the lower holders 40.

When the heights of the panel members P installed on the plurality of securing tools 1 are made uniform, in each securing tools 1, a tool inserted through the tool hole portion 56 of the upper holder 50 and the tool hole portion 16 of the stand 10 is engaged with the tool engaging portion 26 of the shaft 20 to rotate the shaft 20. The stand 10 impedes movement of the shaft 20 in the axial direction. Therefore, the lower holder 40 having the second threaded groove 44 which is engaged with the external thread 21 of the shaft 20 move up and down with the rotation of the shaft 20. FIGS. 5A and 5B illustrate the case when the heights of the upper surfaces of the panel members P are made uniform by changing the height from the lip pieces 63 of each base member 60 to the installation surfaces 42 of each securing tool 1 to a height L2 from a height L1 exaggeratedly relative to the heights in actual adjustment.

Figure 6A:
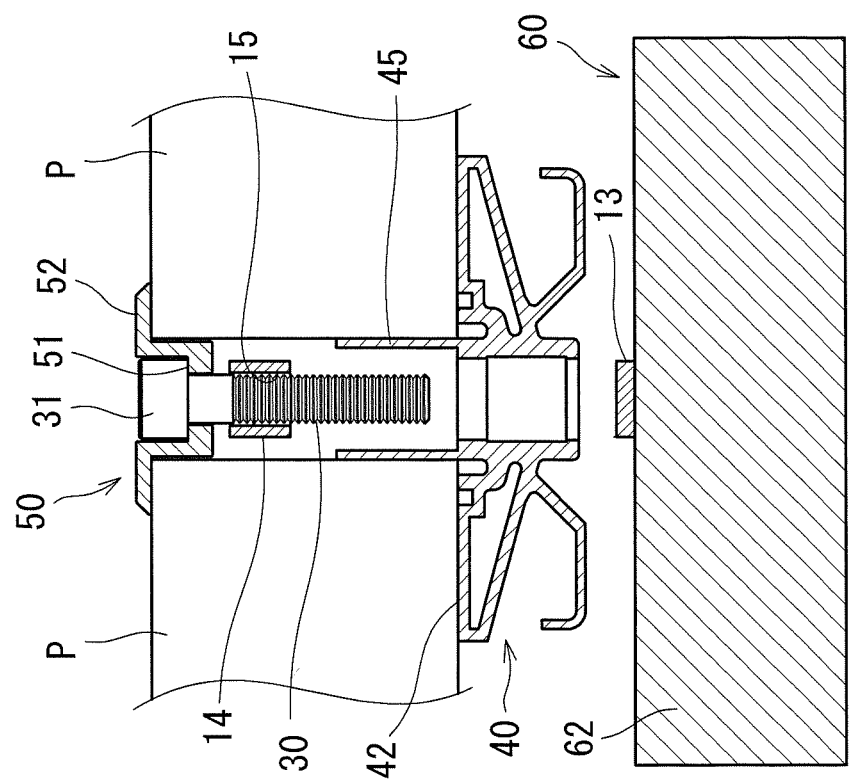
FIGS. 6A and 6B are views for explaining holding of panel members between an upper holder and the lower holder of the securing tool in FIG. 1 using a cross-sectional view cut along line Z-Z.

After the heights of the plurality of panel members P are adjusted, the panel members P are secured onto the base members 60 with the securing tools 1. In each securing tool 1, as illustrated in FIG. 6A, the bolt 30 inserted through the bolt hole portion 55 from above the upper holder 50 is screwed together with the first threaded groove 15 of the stand 10 to be fastened. The head 31 of the bolt 30 is thereby pressed against the flat plate portion 51 of the upper holder 50 and the upper holder 50 is pressed down by the bolt 30.

Figure 6B:
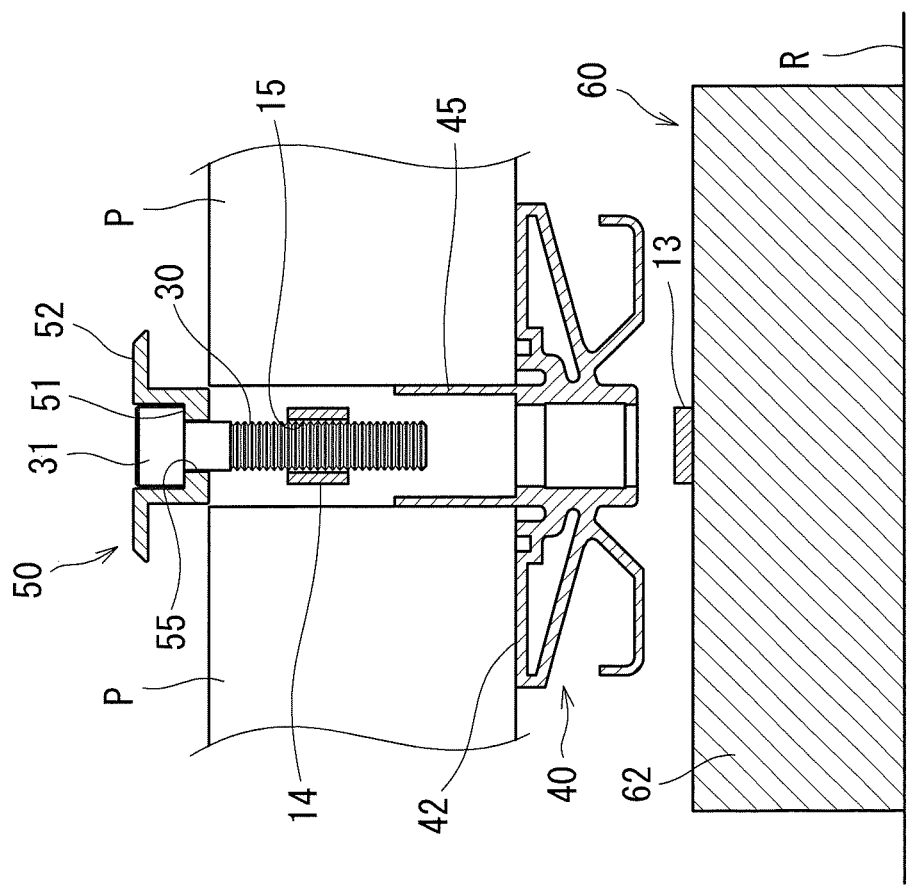
Figure 7:
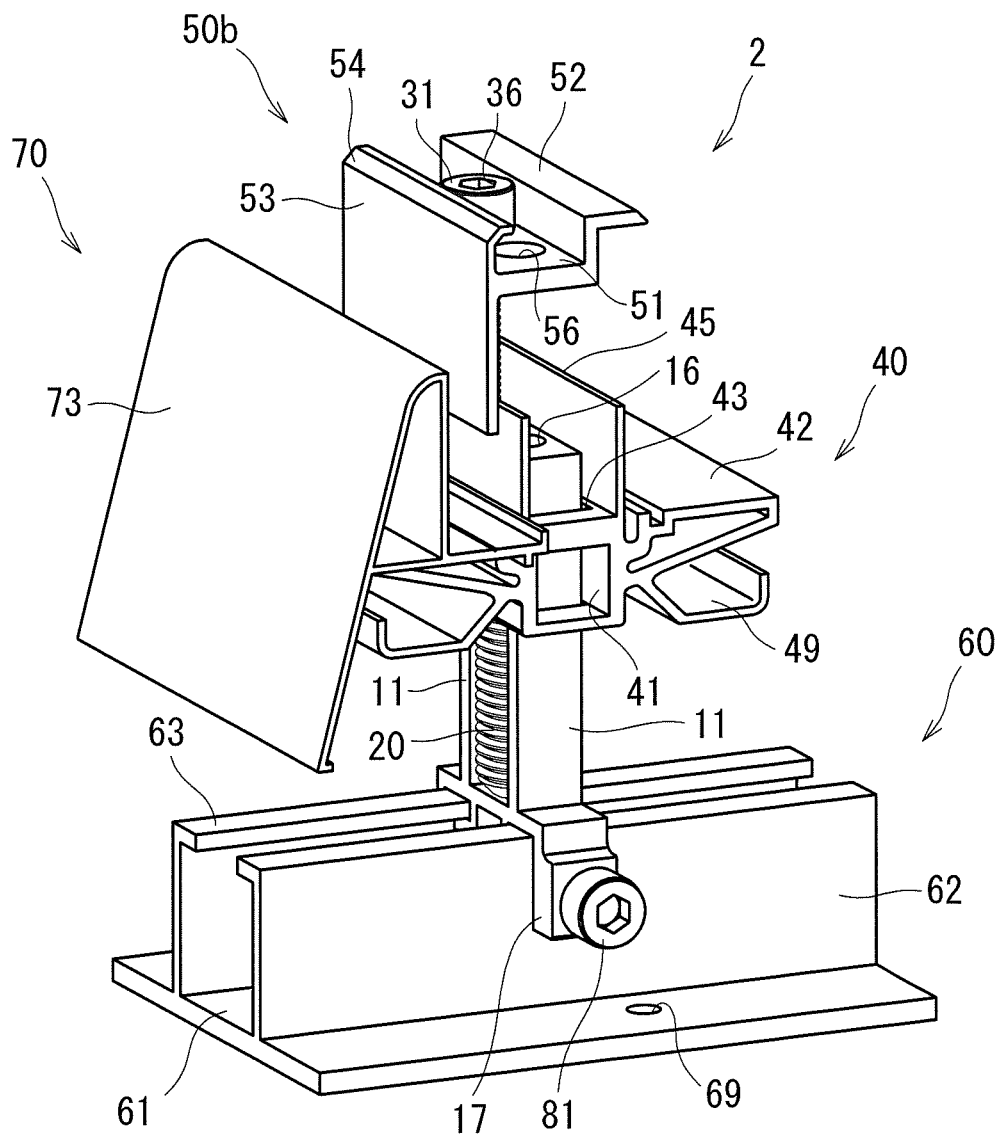
FIG. 7 is a perspective view illustrating a state in which a securing tool according to a second embodiment is secured onto the base member.

As illustrated in FIG. 6B, the two panel pressing portions 52 respectively abut against the upper surfaces of the panel members P and force of pressing the panel members P toward the lower holder 40 act from the panel pressing portions 52. With this, the panel members P are securely held between the upper holder 50 and the lower holder 40. As a result, the panel members P are secured onto the roof face R through the securing tool 1 and the base member 60.

In the same manner, the distances between the panel pressing portions 52 and the installation surfaces 42 can be changed with advancement and retreat of the bolt 30 to and from the first threaded groove 15, and the upper holder 50 has no portion drooping toward the installation surfaces 42. Therefore, each of various types of the panel members P having different heights (thicknesses) can be secured onto the base member 60 using the single type of the securing tool 1.

The bolt hole portion 55 is located at the center of the flat plate portion 51 and is also located at the center of the entire upper holder 50. Accordingly, the fastening force with the bolt 30 evenly acts on the upper holder 50 and the force of pressing the panel members P toward the lower holder 40 by the upper holder 50 acts on the panel members P with good balance.

Next, a securing tool 2 according to a second embodiment and a base member that is used together therewith will be described with reference to FIGS. 7 to 9A. The base member that is used together with the securing tool 2 is the same as the above-described base member 60 that is used together with the securing tool 1. The securing tool 2 is different from the securing tool 1 in a shape of an upper holder 50b and the point that the securing tool 2 is used together with an eaves cover 70 in addition to the base member 60. The securing tool 1 secures the panel members P onto the base member 60 in the state in which the panel members P are respectively installed on the two installation surfaces 42. Unlike the securing tool 1, the securing tool 2 secures the panel member P at the most-eaves side onto the base member 60 in a state in which the panel member P is installed on one of the two installation surfaces 42. The same reference numerals denote the same components of the securing tool 2 as those of the securing tool 1 and detail explanation thereof is omitted.

The shape of the upper holder 50b of the securing tool 2 is different from that of the upper holder 50 of the securing tool 1 in the points that the panel pressing portion 52 projects to only one side from the flat plate portion 51 and the upper holder 50b has a vertical wall 53 forming a right angle with respect to the flat plate portion 51 at the opposite side to the panel pressing portion 52. The vertical wall 53 extends downward from the flat plate portion 51 and extends upward from the flat plate portion 51. A curve portion 54 curving in the direction toward the panel pressing portion 52 is formed at the upper end of the vertical wall 53.

The eaves cover 70 includes a flat plate-like cover base 71, a cover standing wall 72 standing at a right angle from a halfway position of the cover base 71, a covering portion 73 connecting the upper end side of the cover standing wall 72 and one end side of the cover base 71 and extending downward from the cover base 71, and a protrusion 74 projecting downward along the other end side of the cover base 71.

A mounting manner of the securing tool 2 on the base member 60 is similar to the mounting manner of the securing tool 1 on the base member 60 but the panel member is installed only on the installation surface 42 at the ridge side in the two installation surfaces 42 of the lower holder 40.

Furthermore, the upper holder 50*b* is mounted on the stand 10 with the bolt 30 such that the panel pressing portion 52 faces the ridge side. Height adjustment of the panel member with the securing tool 2 is similar to the height adjustment described above for the securing tool 1.

A relation between the upper holder 50*b* and the lower holder 40 when each of the panel members having different heights is held will be described with reference to FIGS. 8A and 8B. The securing tool 2 is similar to the securing tool 1 in the point that it can adapt to the difference in the height of the panel member by changing the distance between the panel pressing portion 52 and the installation surfaces 42 with advancement and retreat of the bolt 30 inserted through the bolt hole portion 55 of the upper holder 50*b* to and from the first threaded groove 15. The securing tool 2 is configured such that the vertical wall 53 of the upper holder 50*b* covers the stopper 45 of the lower holder 40 from the outer side in a state in which the panel member having a height in a height range of mounting targets is held between the upper holder 50*b* and the lower holder 40. The vertical wall 53 thus covers the stopper 45 from the outer side, so that an outer appearance of the securing tool 2 when seen from the eaves side becomes preferable. Furthermore, when force of rotating the upper holder 50*b* so as to incline it to the eaves side with respect to the center axis of the bolt 30 acts on the upper holder 50*b*, the rotation is prevented by abutment of the lower end side of the vertical wall 53 against the stopper 45.

To be specific, the securing tool 2 is configured such that the vertical wall 53 covers an upper portion of the stopper 45 for height of 5 mm to 10 mm when a panel member having a maximum height of H1=50 mm in the height range of the mounting targets is held between the upper holder 50*b* and the lower holder 40. On the other hand, the securing tool 2 is configured such that the vertical wall 53 covers the stopper 45 over the entire height, the vertical wall 53 is inserted into the first groove 46 of the lower holder 40, and a gap of 2 mm to 5 mm exists between the lower end of the vertical wall 53 and a bottom portion of the first groove 46 when a panel member having a minimum height of H2=32 mm in the height range of the mounting targets is held between the upper holder 50*b* and the lower holder 40.

As described above, although the vertical wall 53 extends toward the lower holder 40 from the upper holder 50*b*, the lower end of the vertical wall 53 does not abut against the installation surface 42 in the height range of the panel members as the mounting targets. Therefore, each of various types of panel members having heights in the height range of the mounting targets can be mounted on the roof face R using the single type of the securing tool 2.

When the eaves cover 70 is mounted on the securing tool 2, the cover base 71 is installed on the installation surface 42 at the eaves side by inserting the protrusion 74 projecting downward from the cover base 71 into the second groove 47 at the eaves side in the lower holder 40. A groove 71*g* for positioning of a tapping screw is formed in the cover base 71. The eaves cover 70 can therefore be secured to the lower holder 40 by screwing the tapping screw into the groove 71*g*. The curve portion 54 at the upper end of the vertical wall 53 of the upper holder 50*b* is formed so as to draw a curve continuous to a curve of the covering portion 73 when a panel member having a common height of 35 mm is used.

Figure 9A:
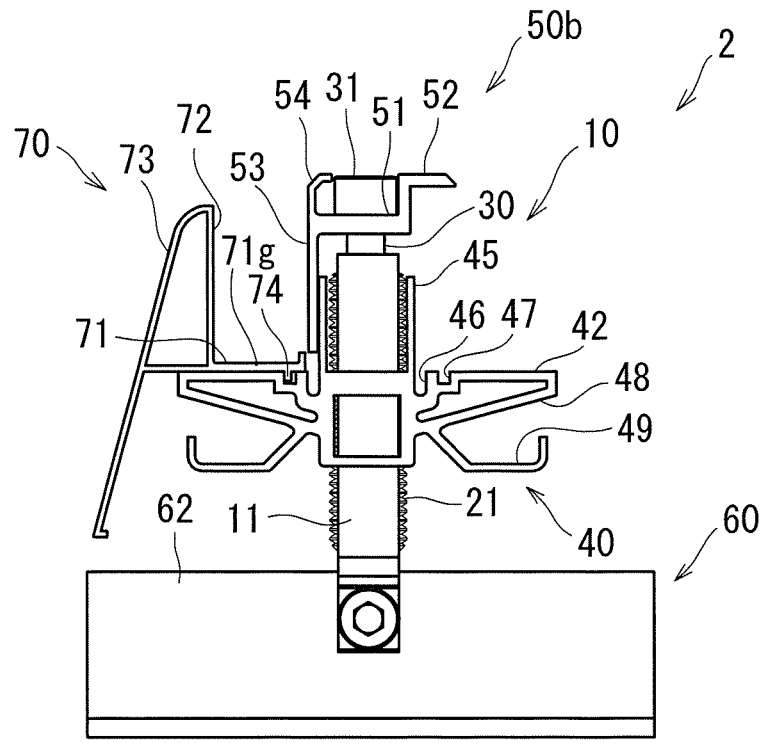
FIG. 9A is a front view illustrating the state in FIG. 7
Figure 9B:
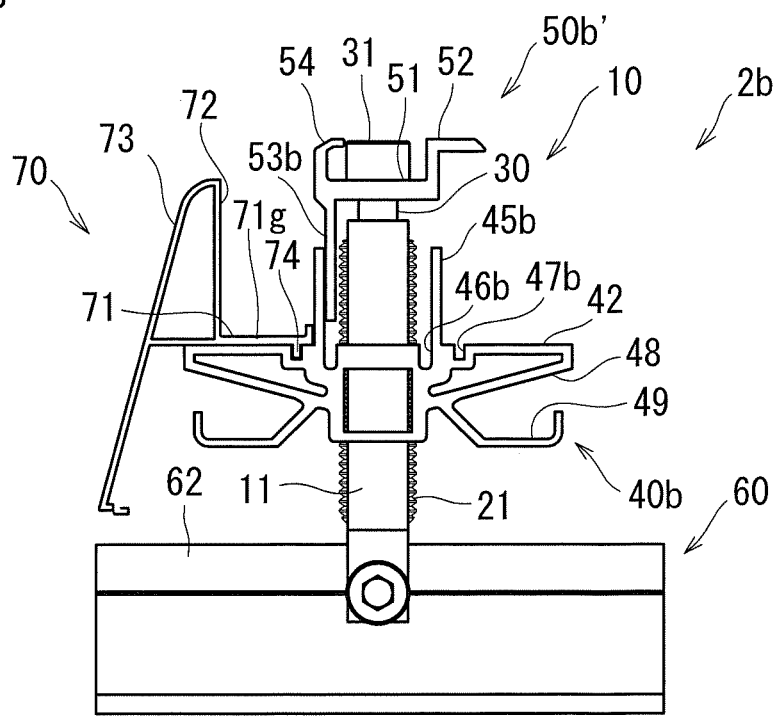
FIG. 9B is a front view illustrating a state in which a securing tool according to a variation of the second embodiment is secured onto the base member.

As a variation of the securing tool 2 in the second embodiment, a securing tool 2*b* illustrated in FIG. 9B can be used. The securing tool 2*b* is different from the securing tool 2 in the point that first grooves 46*b*, stoppers 45*b*, and second grooves 47*b* are formed in this order from the center portion 41 to the outer sides in a lower holder 40*b* of the securing tool 2*b* unlike the securing tool 2 in which the stoppers 45, the first grooves 46, and the second grooves 47 are formed in this order from the center portion 41 to the outer sides in the lower holder 40. Furthermore, with this formation manner, in an upper holder 50*b'*, the position at which a vertical wall 53*b* to be inserted into the first groove 46 when the height of the panel member is small droops from the flat plate portion 51 also deviates to the outer side relative to the corresponding position in the upper holder 50*b*.

Accordingly, the vertical wall 53 of the upper holder 50*b* covers the stopper 45 of the lower holder 40 from the outer side in the securing tool 2 whereas the stopper 45*b* of the lower holder 40*b* covers the vertical wall 53*b* of the upper holder 50*b'* from the outer side in the securing tool 2*b*. With this configuration, even when the upper holder 50*b'* is inclined such that the center axis itself of the bolt 30 is inclined to the eaves side with bending of the bolt 30 in addition to the case when force of rotating the upper holder 50*b'* so as to incline it to the eaves side with respect to the center axis of the bolt 30 acts on the upper holder 50*b'*, the vertical wall 53*b* abuts against the upper end side of the stopper 45*b* to prevent the rotation and inclination. Therefore, a posture of the securing tool 2*b* is made more stable.

In the above description, the panel member at the eaves-most side is secured onto the base member 60 using the securing tool 2 in the second embodiment or the securing tool 2*b* in the variation thereof. Each of the securing tools 2 and 2*b* can also secure the panel member at the ridge-most side onto the base member 60. In this case, the upper holder 50*b* or 50*b'* is secured to the stand 10 with such orientation that the vertical wall 53*b* or 53*b'* is at the ridge side. Unlike the upper holder 50 of the securing tool 1 having a symmetrical shape, each of the upper holders 50*b* and 50*b'* of the securing tools 2 and 2*b* has an asymmetrical shape and the mounting orientation thereof differs depending on whether the mounting position on the roof face R is at the eaves side or the ridge side. Therefore, two tool hole portions 56 are formed through the flat plate portion 51 of each of the upper holders 50*b* and 50*b'* of the securing tools 2 and 2*b* at both sides of the bolt hole portion 55. With the formation of the two tool hole portions 56, one of the two tool hole portions 56 is located at a position just above the tool hole portion 16 of the stand 10 even when the mounting position of each of the securing tools 2 and 2*b* is located at the eaves side or the ridge side.

As described above, each of the securing tools 1, 2, and 2*b* in the embodiments and the securing structure enable the height adjustment while keeping the installation state of the panel member(s) P on the installation surface(s) 42 of the lower holder 40 or 40*b* in the state in which the bolt 30 temporarily fastens the upper holder 50, 50*b*, or 50*b'* or the state in which the upper holder 50, 50*b*, or 50*b'* is not mounted.

The force of fastening the bolt 30 for holding the panel member(s) P between the upper holder 50, 50*b*, or 50*b'* and the lower holder 40 or 40*b* is transmitted to the base member 60 through the stand 10 with the first threaded groove 15 therein. Therefore, the force of fastening the bolt 30 acts on neither of the lower holder 40, the second threaded groove 44, nor the external thread 21 of the shaft 20, and the mechanical strengths required for these components are not so large. Accordingly, each of the securing tools 1, 2, and 2*b* can be reduced in weight and manufacturing cost.

Moreover, the shaft 20 having the external thread 21 is held in the stand 10 and the length of the shaft 20 is substantially equal to the height of the internal space of the stand 10. Accordingly, the mechanical strength of the stand 10 in the axial direction is increased with the presence of the shaft 20.

In addition, when the force acts to lift the panel member(s) P with a strong wind, the force does not act on the bolt 30. Therefore, the risk that the bolt 30 is bent due to a burden applied thereto can be largely reduced.

Each of the securing tools 1, 2, and 2b has the configuration in which the upper holder 50, 50b, or 50b' and the installation surfaces 42 of the lower holder 40 or 40b do not abut against each other in the state in which the panel member(s) is(are) held between the upper holder 50, 50b, or 50b' and the lower holder 40 or 40b. This configuration enables each of various types of the panel members P having different heights to be secured onto the base member 60 using the single type of the securing tool 1, 2, or 2b.

The present invention has been descried above using the preferable embodiments. The invention is however not limited by the above-described embodiments and various improvements and changes in design can be made in a range without departing from the gist of the invention. It should be noted that the same reference numerals denote the same components as those in the above-described embodiments and detail explanation thereof is omitted below.

Figure 10:
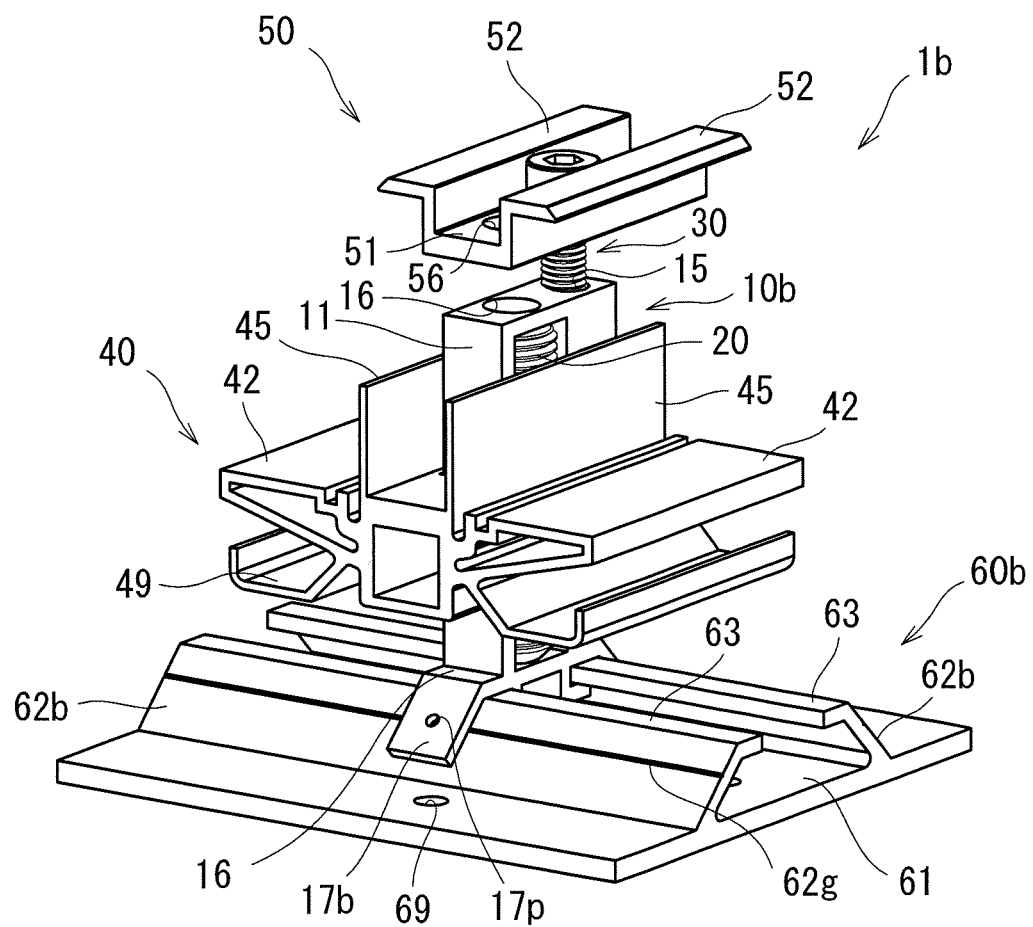
FIG. 10 is a perspective view illustrating a state in which a securing tool according to a variation of the first embodiment is secured onto a base member of another mode.

For example, a base member 60b illustrated in FIG. 10 can be used instead of the base member 60 used together with each of the securing tools 1, 2, and 2b in the above-described securing structure. The base member 60b is different from the base member 60 in the point that a pair of standing wall portions 62b is moderately inclined with respect to the base surface 61 in the base member 60b unlike the base member 60 in which the pair of standing wall portions 62 forms the right angels with respect to the base surface 61. With this configuration, a securing tool 1b having a stand 10b with an angle formed by locking pieces 17b with respect to the bottom surface portion 13, which is the same as the angle formed by the standing wall portions 62b with respect to the base surface 61, is used as the securing tool. Furthermore, each of the securing tools 1, 2, and 2b is secured onto the base member 60 with the bolt 80 inserted through the hole portion 17h with the threaded groove, which is formed through the locking piece 17. On the other hand, the securing tool 1b is secured onto the base member 60b by fastening the locking pieces 17b to the standing wall portions 62b with tapping screws (not illustrated) inserted through screw holes 17p penetrating through the locking pieces 17b. Grooves 62g for positioning the tapping screws are formed in the surfaces of the standing wall portions 62b. The operation of screwing the tapping screws is easily performed because the standing wall portions 62b are moderately inclined with respect to the base surface 61.

The base member 60b having this configuration can be reduced in height in comparison with the base member 60, thereby providing the advantage that an outer appearance in the state in which the panel members are mounted on the roof face is more preferable. On the other hand, the base member 60 tends to be increased in height in comparison with the base member 60b and a space below the panel members is increased. Accordingly, when the panel member is a solar battery module, there is an advantage that heat dissipation from the solar batteries is accelerated to enhance heat generation efficiency.

FIG. 10 illustrates the securing tool 1b having the same configuration as that of the securing tool 1 in the first embodiment except the angle of the locking pieces 17b with respect to the bottom surface portion 13. However, a securing tool having the configuration in which the angle of the locking pieces 17 of the securing tool 2 or 2b is changed in the same manner as that in the securing tool 1b can also be used together with the base member 60b and the same action effects as the above-described effects can be provided.

Figure 11:
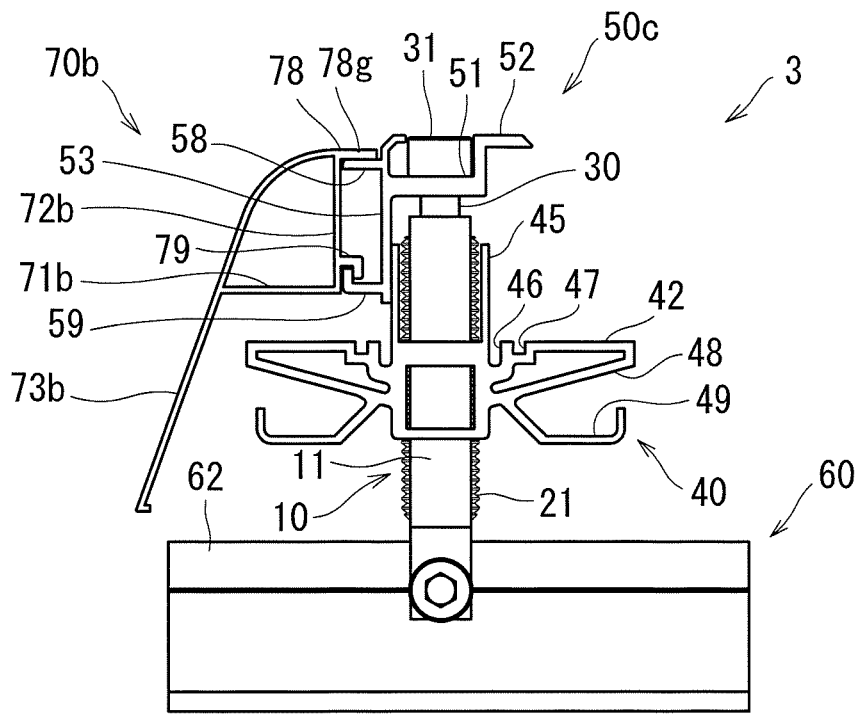
FIG. 11 is a front view illustrating a state in which a securing tool according to a third embodiment is secured onto the base member.

The eaves cover 70 that is used together with each of the securing tools 2 and 2b is secured to the installation surface 42 of the lower holder 40 or 40b and is moved up and down separately from the upper holder 50, 50b, or 50b'. The configuration is not however limited thereto and an eaves cover 70b that is used together with a securing tool 3 can be integrally configured with an upper holder 50c, as illustrated in FIG. 11. The securing tool 3 illustrated in FIG. 11 has the same configuration as that of the securing tools 1 and 2 except the upper holder 50c. The upper holder 50c of the securing tool 3 has a shape that is approximated to that of the upper holder 50b of the securing tool 2 and corresponds to a configuration provided by adding, to the configuration of the upper holder 50b, a flat plate-like upper locking portion 58 projecting to the opposite side to the flat plate portion 51 from an upper portion of the vertical wall 53 and a flat plate-like lower locking portion 59 projecting to the same side from a lower portion of the vertical wall 53. The lower locking portion 59 with a front end bent upward has a cross section of a shape obtained by turning an L shape sideways.

On the other hand, the eaves cover 70b has a flat plate-like cover base 71b, a cover standing wall 72b erected at a right angle from one end side of the cover base 71b, a covering portion 73b connecting the upper end side of the cover standing wall 72b and the other end side of the cover base 71b and extending downward from the cover base 71b, an upper installation surface 78 extending into a flat plate form to the opposite side to the covering portion 73b from the upper end of the cover standing wall 72b and installed on the upper locking portion 58 of the upper holder 50c, and a lower locking portion 79 projecting in the same direction as the upper installation surface 78 from a lower portion of the cover standing wall 72b and having a cross section of a shape obtained by turning an inverted L shape sideways so as to be engaged with the lower locking portion 59 of the upper holder 50c. A groove 78g for positioning a tapping screw is formed in the upper installation surface 78.

With this configuration, the eaves cover 70b is integrated with the upper holder 50c by installing the upper installation surface 78 of the eaves cover 70b on the upper locking portion 58 of the upper holder 50c, engaging the lower locking portion 79 of the eaves cover 70b and the lower locking portion 59 of the upper holder 50c with each other, and screwing the tapping screw (not illustrated) into the overlapped upper installation surface 78 and upper locking portion 58. Even the eaves cover 70b having this configuration can adjust, with no problem, the distance between the panel pressing portion 52 and the installation surface 42 in accordance with the height of the panel member with advancement and retreat of the bolt 30 to and from the first threaded groove 15. Furthermore, coverage of at least a part of the stopper 45 with the vertical wall 53 can prevent rotation of the upper holder 50c when force of rotating the upper holder 50c so as to incline it to the eaves side with respect to the center axis of the bolt 30 acts on the upper holder 50b. In addition, a securing structure with a neat appearance and having a high designing property can be constructed because the covering portion 73b covers substantially the entire securing tool 3 when seen from the eaves side.

Figure 12:
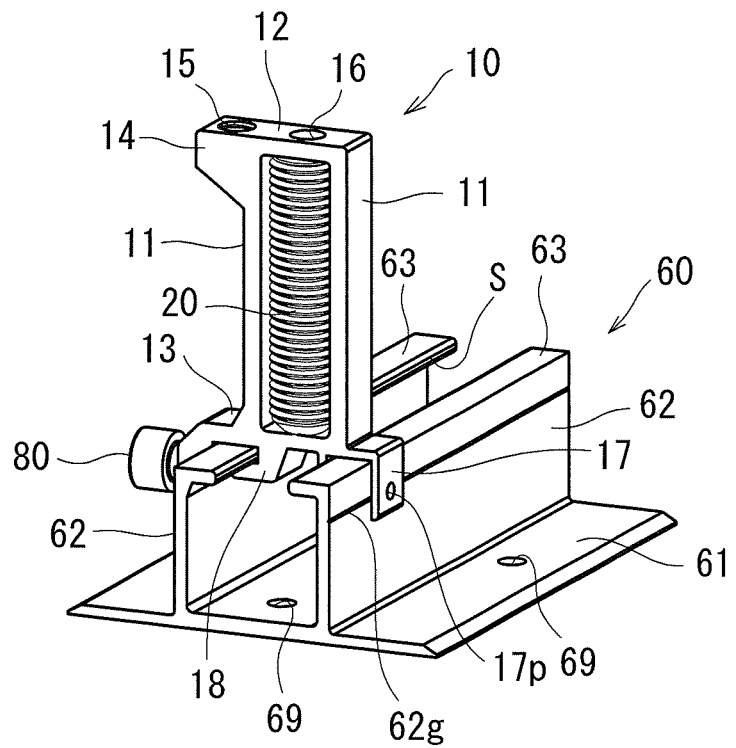
FIG. 12 is a perspective view illustrating another mode of fastening of a securing tool to a base member.

In the above description, each of the securing tools 1, 2, and 2b has, in one of the pair of locking pieces 17, the hole portion 17h with the threaded groove formed on the inner circumferential surface thereof, and is secured onto the base member 60 with friction between the bolt 80 inserted through the hole portion 17h and the standing wall portion 62, as an example. The configuration is not limited thereto and the following configuration can be employed. That is, as illustrated in FIG. 12, in the stand 10 of the securing tool 1, 2, or 2b, one of the pair of locking pieces 17 has the hole portion 17h through which the bolt 80 is inserted. Furthermore, the other of the locking pieces 17 has the screw hole 17p through which the tapping screw is inserted, and the groove 62g for positioning the tapping screw is formed in one of the standing wall portions 62 of the base member 60. With this configuration, the securing tool 1, 2, or 2b can be secured onto the base member 60 with the bolt 80 inserted through the hole portion 17h and the securing of the securing tool 1, 2, or 2b onto the base member 60 can be strengthened by screwing the tapping screw inserted through the screw hole 17p into the groove 62g.

When the plurality of securing tools 1, 2, or 2b each of which has both of the hole portion 17h and the screw hole 17p are secured onto the base members 60, not all of the securing tools 1, 2, or 2b are required to be secured onto the base members 60 with both of the bolts 80 inserted through the hole portions 17h and the tapping screw inserted through the screw holes 17p. Whether one or both of securing with the bolts 80 inserted through the hole portions 17h and securing with the tapping screws inserted through the screw holes 17p can be selected to be employed in accordance with the mounting strength required for the securing tools 1, 2, or 2b depending on present environments of the roof face on which the panel members are mounted, such as a strong wind area and a heavy snowfall area.

Furthermore, in the above-described embodiments, the tool hole portion 16 located on the extended line of the center axis of the shaft 20 is formed through the top surface portion 12 of the stand 10 or 10b, as an example. The configuration is not limited thereto and a stand having the configuration in which a pair of upper shelf portions extends toward the mating sides from the vicinities of the upper ends of the pair of side wall portions of the stand instead of the top surface portion can be employed. Provision of a space between the pair of upper shelf portions on the extended line of the center axis of the shaft enables a tool to reach the tool engaging portion of the shaft.

What is claimed is:

1. A panel member securing structure comprising a base member that is fastened to a roof face and a securing tool that secures a panel member onto the base member,
   wherein the securing tool includes a stand, a lower holder moving up and down along the stand, an upper holder holding the panel member together with the lower holder, and a shaft with an external thread formed on an outer circumferential surface,
   the stand has a pair of side wall portions, holds the shaft between the side wall portions in a state of restricting movement of the shaft in an axial direction, and has a first threaded groove at a position which is not interfered with the shaft,
   the shaft is exposed from the stand in a radial direction of the external thread and has a tool engaging portion on an end portion,
   the lower holder has a cylindrical portion through which the stand is inserted, a second threaded groove formed on an inner circumferential surface of the cylindrical portion, and two installation surfaces extending to both sides outward from the cylindrical portion in a direction orthogonal to an axial direction of the cylindrical portion,
   the upper holder has a flat plate portion through which a bolt hole portion and a tool hole portion are formed, and (a) panel pressing portion(s) extending to both sides or one side outward from the flat plate portion,
   the stand is erected from the base member,
   the panel member is held between at least one of the installation surfaces and the panel pressing portion by fastening a bolt inserted through the bolt hole portion to the first threaded groove,
   a portion of the external thread, which is exposed from the stand, and the second threaded groove are screwed together, and
   the tool hole portion is located on an extended line of a center axis of the shaft and a hole portion or a space is formed on the extended line between the shaft and the tool hole portion in the stand.

2. The panel member securing structure according to claim 1, wherein the upper holder does not abut against the installation surfaces of the lower holder.

3. A panel member securing tool comprising a stand, a lower holder moving up and down along the stand, an upper holder for holding a panel member together with the lower holder, and a shaft with an external thread formed on an outer circumferential surface,
   the stand has a pair of side wall portions, holds the shaft between the side wall portions in a state of restricting movement of the shaft in an axial direction, and has a first threaded groove at a position which is not interfered with the shaft,
   the shaft is exposed from the stand in a radial direction of the external thread and has a tool engaging portion on an end portion,
   the lower holder has a cylindrical portion through which the stand is inserted, a second threaded groove formed on an inner circumferential surface of the cylindrical portion, and two installation surfaces extending to both sides outward from the cylindrical portion in a direction orthogonal to an axial direction of the cylindrical portion,
   the upper holder has a flat plate portion through which a bolt hole portion and a tool hole portion are formed, and (a) panel pressing portion(s) extending to both sides or one side outward from the flat plate portion,
   a bolt inserted through the bolt hole portion is screwed together with the first threaded groove,
   a portion of the external thread, which is exposed from the stand, and the second threaded groove are screwed together, and
   the tool hole portion is located on an extended line of a center axis of the shaft and a hole portion or a space is formed on the extended line between the shaft and the tool hole portion in the stand.

4. A securing structure for adjustably securing a panel member on a predetermined surface, comprising:
   a base member that is fastened to a roof face; and
   a securing tool engaged with the base member for adjustably securing a panel member with respect to the roof, the securing tool further comprising:
      a stand engaged with the base member and having a top surface portion forming a first threaded groove therein and a pair of side wall portions for rotatably holding a shaft therein and partially exposing the shaft having an external thread formed on an outer circumferential surface; and a pair of a lower holder and an upper holder for adjustably holding the panel member and engaging the first threaded groove in the top surface portion via a first predetermined bolt, at least the lower holder having a cylindrical portion through which the stand is inserted, a second threaded groove being formed on an inner circumferential surface of the cylindrical portion so as to engage with the external thread of the shaft.

5. The securing structure for securing a panel member on a predetermined surface according to claim 4, wherein a tool hole portion is provided through the upper holder and the top surface portion above a center axis of the shaft for accessing the shaft to rotate the shaft so as to adjust a height of the panel member with respect to the roof.

6. The securing structure for securing a panel member on a predetermined surface according to claim 5, wherein the lower holder and the upper holder respectively have a center portion and a flat plate portion, a bolt hole portion and the tool hole portion are formed on the flat plate portion, and a pair of panel pressing portions laterally extends from the flat plate portion while a pair of installation surfaces laterally extends from the center portion.

7. The securing structure for securing a panel member on a predetermined surface according to claim 5, wherein the lower holder and the upper holder respectively have a center portion and a flat plate portion, a bolt hole portion and the tool hole portion are formed on the flat plate portion, and a single panel pressing portion laterally extends from the flat plate portion while a pair of installation surfaces laterally extends from the center portion, the securing tool further comprising an eaves cover fixedly placed on one of the installation surfaces.

8. The securing structure for securing a panel member on a predetermined surface according to claim 4, wherein a length of the shaft substantially extends to an entire length of the side wall portions.

* * * * *